United States Patent
Bendixen et al.

(10) Patent No.: US 9,559,745 B2
(45) Date of Patent: Jan. 31, 2017

(54) DEDICATED SHUNT SWITCH WITH IMPROVED GROUND

(71) Applicant: RF Micro Devices, Inc., Greensboro, NC (US)

(72) Inventors: Jeppe Korshøj Bendixen, Vrå (DK); Daniel Charles Kerr, Oak Ridge, NC (US); Christian Rye Iversen, Vestbjerg (DK)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/171,994

(22) Filed: Feb. 4, 2014

(65) Prior Publication Data

US 2014/0220911 A1 Aug. 7, 2014

Related U.S. Application Data

(60) Provisional application No. 61/760,878, filed on Feb. 5, 2013.

(51) Int. Cl.
*H04B 1/44* (2006.01)
*H01Q 1/24* (2006.01)

(52) U.S. Cl.
CPC ............. *H04B 1/44* (2013.01); *H01Q 1/242* (2013.01)

(58) Field of Classification Search
USPC ... 455/121, 123, 115.1, 126, 67.11, 68, 107; 333/17.3, 32, 17.1; 343/702, 700, 876, 850, 343/745, 846, 815, 816, 817, 818; 340/572.4; 375/132, 219
See application file for complete search history.

(56) References Cited

U.S. PATENT DOCUMENTS

| | | | | |
|---|---|---|---|---|
| 6,693,594 B2* | 2/2004 | Pankinaho | ............. | H01Q 1/243 343/700 MS |
| 6,912,082 B1* | 6/2005 | Lu | ..................... | B81C 1/00246 257/E27.112 |
| 8,233,856 B2* | 7/2012 | Bezooijen | ................ | H04B 1/18 333/17.3 |
| 2006/0181340 A1* | 8/2006 | Dhuyvetter | ............. | H03F 3/087 330/6 |

OTHER PUBLICATIONS

Andre van Bezooijen et al, Adaptive Impedance-Matching Techniques for controlling L networks, Feb. 10, 2010, IEEE transactions on circuits and systems, vol. 57, No. 2.*
Andre van Bezooijen et al, A GSM/EDGE/WCDMA Adaptive Series—LC Matching Network Using RF-MEMS Switches, Oct. 8, 2008, IEEE journal of solid-state circuits, vol. 43, No. 10.*

* cited by examiner

*Primary Examiner* — Wesley Kim
*Assistant Examiner* — Raj Chakraborty
(74) *Attorney, Agent, or Firm* — Withrow & Terranova, P.L.L.C.

(57) ABSTRACT

Antenna tuning switch circuitry includes an input port, a shunt switch, control circuitry, and an integrated ground. The shunt switch is coupled between the input port and the integrated ground. The control circuitry includes a control signal input port, a switch driver output port coupled to the shunt switch, and a ground connection port coupled to the integrated ground. The shunt switches, the RF input ports, the control circuitry, and the integrated ground are monolithically integrated on a single semiconductor die. The antenna tuning switch circuitry is adapted to selectively couple the input port to the integrated ground in order to alter one or more operating parameters of an attached antenna. By monolithically integrating the shunt switch together with the control circuitry and the integrated ground, the ON state impedance and the parasitic OFF state imped- (Continued)

ance of the antenna tuning switch circuitry can be significantly improved.

20 Claims, 10 Drawing Sheets

DEDICATED SHUNT SWITCH WITH IMPROVED GROUND

RELATED APPLICATIONS

This application claims the benefit of U.S. provisional patent application Ser. No. 61/760,878, filed Feb. 5, 2013, the disclosure of which is incorporated herein by reference in its entirety.

FIELD OF THE DISCLOSURE

The present disclosure relates to tunable antennas. Specifically, the present disclosure relates to switching devices for use in antenna tuning circuitry.

BACKGROUND

Modern wireless communications standards require a mobile terminal to be capable of transmitting and receiving wireless signals over a wide range of frequencies. On its own, an antenna can generally only transmit and receive signals efficiently within a relatively narrow frequency band. Accordingly, tuning circuitry must be attached to the antenna in order to widen the frequency band over which an antenna can efficiently transmit and receive signals.

FIG. 1A shows an exemplary tunable patch antenna 10 for use in a mobile terminal. The tunable patch antenna 10 includes a substrate 12, an antenna surface 14, a grounding plane 16, an RF feed 18, and one or more tuning leads 20. The substrate 12 is located between the antenna surface 14 and the grounding plane 16. The RF feed 18 runs through the grounding plane 16 and the substrate 12 to contact the antenna surface 14. Each one of the tuning leads 20 runs between a point of the antenna surface 14 and a fixed impedance, such as the grounding plane 16.

In a transmit mode of operation, an RF signal is delivered to the RF feed 18. The RF signal runs past the grounding plane 16 and the substrate 12 to the antenna surface 14, where it is then radiated into the environment. By selectively placing one or more of the tuning leads 20 between a point of the antenna surface 14 and a fixed impedance, the impedance of the tunable patch antenna 10 can be changed. As the impedance of the tunable patch antenna 10 is changed, the transmission characteristics of the tunable patch antenna 10 similarly change. Accordingly, by selectively placing one or more of the tuning leads 20 in contact with a fixed impedance, a "sweet spot" having a maximum efficiency for transmission of a signal about a given frequency band may be found, thereby enabling the tunable patch antenna 10 to efficiently operate over a wider range of transmission frequencies than would otherwise be possible.

In a receive mode of operation, an RF signal arrives at the antenna surface 14 from the surrounding environment. The RF signal is passed from the antenna surface 14 to the RF feed 18, where it is subsequently delivered to one or more components in the front end circuitry of a mobile terminal (not shown). By selectively placing one or more of the tuning leads 20 between a point of the antenna surface 14 and a fixed impedance, the impedance of the tunable patch antenna 10 can be changed. As the impedance of the tunable patch antenna 10 is changed, the reception characteristics of the tunable patch antenna 10 similarly change. Accordingly, by selectively placing one or more of the tuning leads 20 in contact with a fixed impedance, a "sweet spot" having a maximum efficiency for reception of signals about a given frequency band may be found, thereby enabling the tunable patch antenna 10 to efficiently operate over a wider range of reception frequency than would otherwise be possible.

FIG. 1B shows a three-dimensional representation of the tunable patch antenna 10 shown in FIG. 1A. As shown in FIG. 1B, each one of the tuning leads 20 is spread out over the width of the antenna surface 14, and includes conventional antenna tuning switch circuitry 22 for selectively placing the tuning lead 20 in contact with a fixed impedance such as the grounding plane 16. As discussed above, as each one of the tuning leads 20 are placed in contact with a fixed impedance, the transmission and reception characteristics of the tunable patch antenna 10 are changed, thereby allowing for efficient transmission and reception of RF signals across a wide range of frequencies.

Although effective at altering the transmission and/or reception characteristics of the tunable patch antenna 10, the conventional antenna tuning switch circuitry 22 coupled to each one of the tuning leads 20 may itself degrade the performance of the tunable patch antenna 10. For example, the conventional antenna tuning switch circuitry 22 attached to each one of the tuning leads 20 may introduce insertion loss in the signal path of the antenna in the ON state, may introduce parasitic capacitance and/or inductance in the signal path of the antenna in the OFF state, and may be prone to breaking down, thereby causing one or more of the tuning leads 20 to unintentionally turn ON and change the transmission and/or reception characteristics of the tunable patch antenna 10.

FIG. 2 shows conventional antenna tuning switch circuitry 22 for use in the tunable patch antenna 10 shown in FIGS. 1A and 1B. The conventional antenna tuning switch circuitry 22 includes a semiconductor die 24, a shunt switch SH_SW, an electrostatic discharge (ESD) protection switch ESD_SW, an input port 26, a first ground port 28, a second ground port 30, control circuitry 32, a control port 34, a supply voltage port 36, and an off-die ground 38. The shunt switch SH_SW is coupled between the input port 26 and the first ground port 28. The ESD protection switch ESD_SW is coupled between the first ground port 28 and the second ground port 30. The control circuitry 32 includes a control signal input port 40 coupled to the control port 34, a ground connection port 42 coupled to the second ground port 30, a switch driver output port 44 coupled to the shunt switch SH_SW, and a supply voltage input port 46 coupled to the supply voltage port 36. The shunt switch SH_SW, the ESD protection switch ESD_SW, the input port 26, the first ground port 28, the second ground port 30, the control circuitry 32, and the control port 34 are integrated on the semiconductor die 24. The first ground port 28 is coupled to the off-die ground 38 via a first ground connection 48. The second ground port 30 is coupled to the off-die ground 38 via a second ground connection 50.

In operation, the input port 26 of the conventional antenna tuning switch circuitry 22 is coupled to a point on the antenna surface 14 of the tunable patch antenna 10 through one of the tuning leads 20. In order to alter the transmission and/or reception characteristics of the tunable patch antenna 10 in response to one or more control signals CTL_SIG received at the control port 34, the control circuitry 32 may close the shunt switch SH_SW to couple the input port 26 to a fixed impedance, such as ground. Due to the differences in the parasitic inductance of the first ground connection 48 and the second ground connection 50, a potential voltage difference may exist between the first ground port 28 and the second ground port 30 over a variety of operating conditions. Accordingly, the impedance of the path from the input port 26 through the control circuitry 32 to the second ground port 30 has the potential to be lower than the path from the input port 26 through the shunt switch SH_SW to the first ground port 28. Due to the potential for a low impedance path to be presented through the control circuitry 32, should an ESD event occur, it may pass through the control circuitry 32 to the second ground port 30, thereby damaging or disabling the control circuitry 32. Accordingly, the ESD protection switch ESD_SW is necessarily included in the conventional antenna tuning switch circuitry 22 to couple the first ground port 28 and the second ground port 30 in the event of an ESD event so that the lowest impedance path to ground is provided around, rather than through, the control circuitry 32.

FIG. 3A shows a simplified equivalent circuit for the conventional antenna tuning switch circuitry 22 when the conventional antenna tuning switch circuitry 22 is in an ON state of operation. As shown in FIG. 3A, the ON impedance of the conventional antenna tuning switch circuitry 22 can be represented by the following equation:

$$Z_{ON} = Z_{ON\_SH} + [(Z_{OFF\_ESD} + L_{C2}) // L_{C1}] \quad (1)$$

where $Z_{ON\_SH}$ is equal to the ON impedance of the shunt switch SH_SW, $Z_{OFF\_ESD}$ is equal to the parasitic impedance of the ESD protection switch ESD_SW when the ESD protection switch ESD_SW is in the OFF state, $L_{C2}$ is equal to the equivalent inductance of the second ground connection 50, and $L_{C1}$ is equal to the equivalent inductance of the first ground connection 48. As shown by FIG. 3A and equation 1, the ESD protection switch ESD_SW, the first ground connection 48, and the second ground connection 50 may significantly contribute to the ON impedance of the conventional antenna tuning switch circuitry 22. The additional impedance provided by the ESD protection switch ESD_SW, the first ground connection 48, and the second ground connection 50 increases the insertion loss of the RF signal path in the tunable patch antenna 10, thereby degrading the quality of signals transmitted and received by the tunable patch antenna 10.

FIG. 3B shows a simplified equivalent circuit for the conventional antenna tuning switch circuitry 22 when the conventional antenna tuning switch circuitry 22 is in an OFF state of operation. As shown in FIG. 3A, the parasitic OFF state impedance of the conventional antenna tuning switch circuitry 22 can be represented by the following equation:

$$Z_{OFF} = Z_{OFF\_SH} + [(Z_{OFF\_ESD} + L_{C2}) // L_{C1}] \quad (2)$$

where $Z_{OFF\_SH}$ is equal to the parasitic OFF state impedance of the shunt switch SH_SW, $Z_{OFF\_ESD}$ is equal to the parasitic impedance of the ESD protection switch ESD_SW when the ESD protection switch ESD_SW is in the OFF state, $L_{C2}$ is equal to the equivalent inductance of the second ground connection 50, and $L_{C1}$ is equal to the equivalent inductance of the first ground connection 48. As shown by FIG. 3B and equation 2, the ESD protection switch ESD_SW, the first ground connection 48, and the second ground connection 50 may significantly contribute to the parasitic OFF state impedance of the conventional antenna tuning switch circuitry 22. The additional impedance provided by the ESD protection switch ESD_SW, the first ground connection 48, and the second ground connection 50 increases the insertion loss of the RF signal path in the tunable patch antenna 10, thereby degrading the quality of signals transmitted and received by the tunable patch antenna 10.

Accordingly, a tuning switch for a tunable patch antenna 10 is required that is capable of providing a low impedance path to a fixed impedance in the ON state, introducing a low parasitic load on the antenna in the OFF state, and handling high amplitude signals.

SUMMARY

Antenna tuning switch circuitry includes an input port, a shunt switch, control circuitry, and an integrated ground. The shunt switch is coupled between the input port and the integrated ground. The control circuitry includes a control signal input port, a switch driver output port coupled to the shunt switch, and a ground connection port coupled to the integrated ground. The shunt switches, the RF input ports, the control circuitry, and the integrated ground are monolithically integrated on a single semiconductor die. The antenna tuning switch circuitry is adapted to selectively couple the input port to the integrated ground in order to alter one or more operating parameters of an attached antenna.

By monolithically integrating the shunt switch and control circuitry together on a single semiconductor die with the integrated ground, the parasitic impedance associated with the antenna tuning circuitry is reduced, thereby improving the performance of an antenna to which the antenna tuning circuitry is attached. Further, connecting both the shunt switch and the control circuitry to the integrated ground allows for built-in protection for the control circuitry from electro-static discharge (ESD). By using the built-in ESD protection for the control circuitry, a shunt ESD protection switch can be eliminated from the switching path of the antenna tuning switch circuitry, thereby further reducing the parasitic impedance associated with the antenna tuning circuitry and further improving the performance of an antenna to which the antenna tuning switch circuitry is attached.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1A:
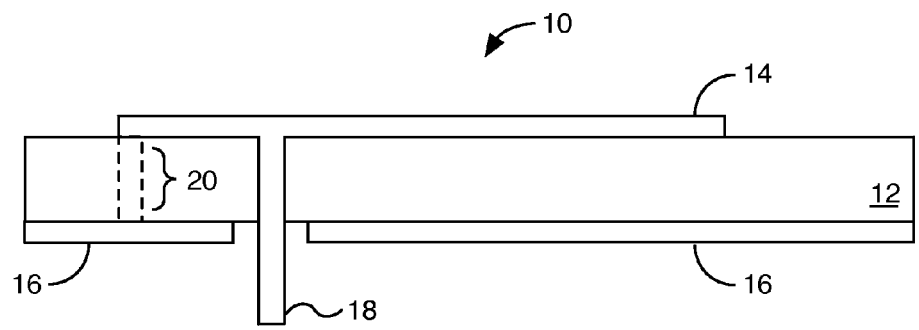
FIGS. 1A and 1B show a tunable patch antenna for use in a mobile terminal.
Figure 1B:
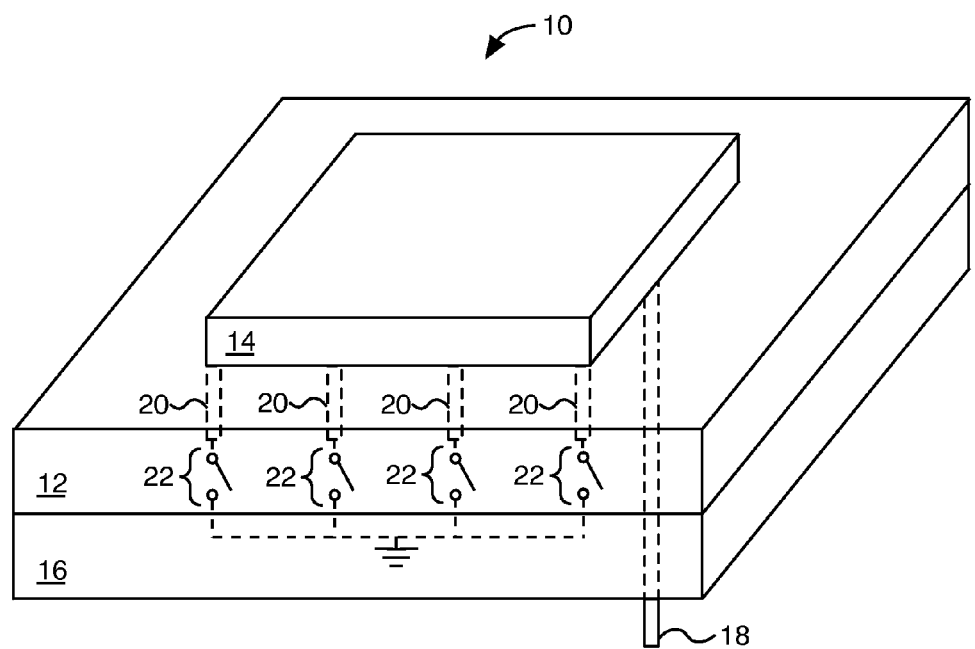
Figure 2:
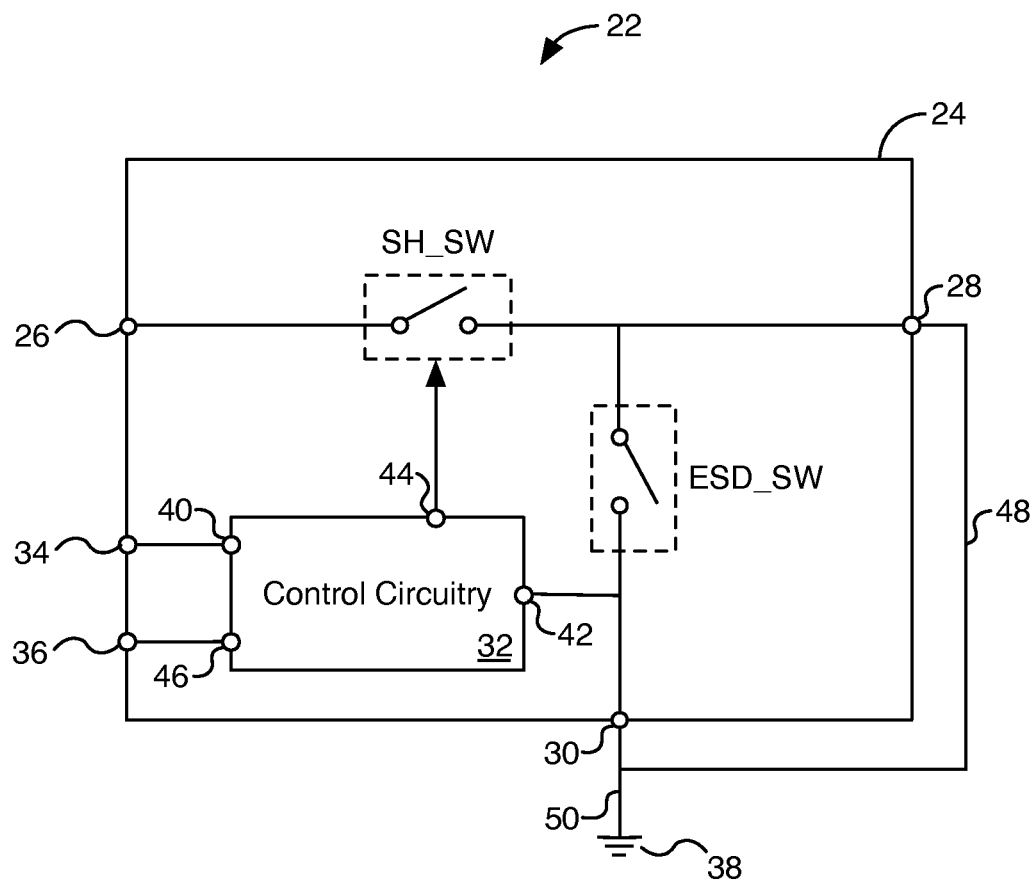
FIG. 2 shows a schematic representation of conventional antenna tuning switch circuitry for use in the antenna tuning circuitry of the tunable patch antenna shown in FIGS. 1A and 1B.
Figure 3A:
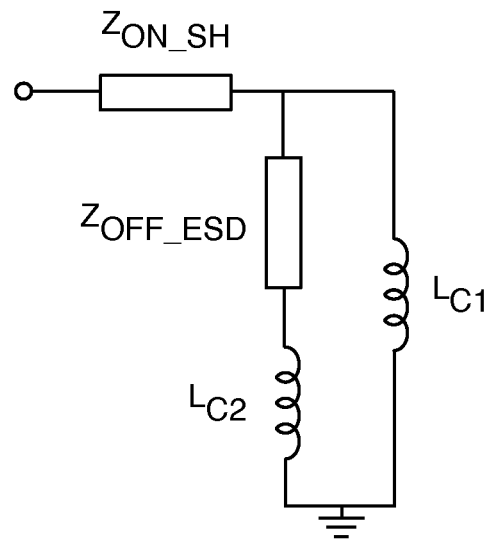
FIGS. 3A and 3B show simplified equivalent circuits for the conventional antenna tuning switch circuitry shown in FIG. 2 in the ON state of the antenna tuning switch circuitry, and in the OFF state of the antenna tuning switch circuitry, respectively.
Figure 3B:
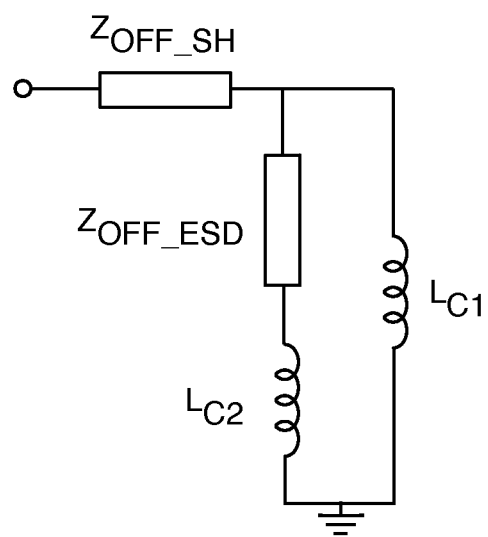
Figure 4:
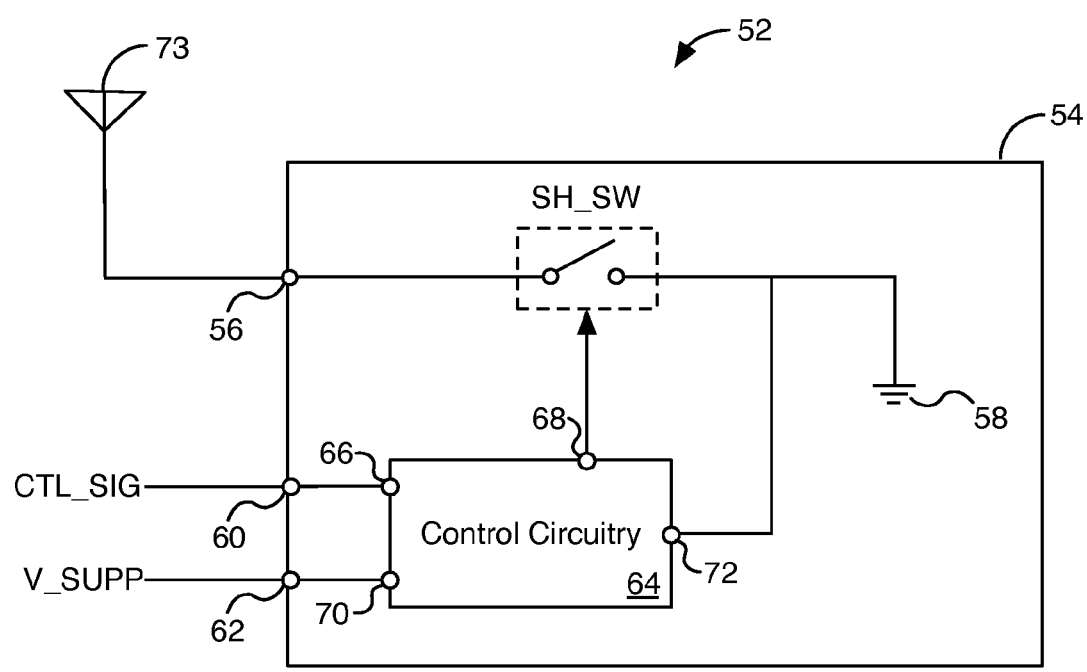
FIG. 4 shows a schematic representation of a shunt tuning switch for use in the antenna tuning switch circuitry of a tunable antenna according to one embodiment of the present disclosure.

Turning now to FIG. 4, a schematic representation of antenna tuning switch circuitry 52 is shown according to one embodiment of the present disclosure. The antenna tuning switch circuitry 52 includes a semiconductor die 54, an input port 56, a shunt switch SH_SW, an integrated ground 58, a control port 60, a supply voltage port 62, and control circuitry 64. The shunt switch SH_SW is coupled between the input port 56 and the integrated ground 58. The control circuitry 64 includes a control signal input port 66 coupled to the control port 60, a switch driver output port 68 coupled to the shunt switch SH_SW, a supply voltage input port 70 coupled to the supply voltage port 62, and a ground connection port 72 coupled to the integrated ground 58. The input port 56, the shunt switch SH_SW, the integrated ground 58, the control port 60, the supply voltage port 62, and the control circuitry 64 are monolithically integrated together on the semiconductor die 54.

In operation, the input port 56 of the antenna tuning switch circuitry 52 is coupled to a point on an antenna surface of a tunable antenna. In order to alter the transmission and/or reception characteristics of an attached antenna in response to one or more control signals CTL_SIG received at the control port 60, the control circuitry 64 may close the shunt switch SH_SW to couple the input port 56 to a fixed impedance, such as the integrated ground 58. By coupling the input port 56 to a fixed impedance, the impedance of the attached antenna can be selectively altered. Altering the impedance of an attached antenna may allow the antenna to operate efficiently over a wider range of frequencies.

The integrated ground 58 may be a high quality ground connection provided locally on the semiconductor die used to form the antenna switch circuitry 52. Specifically, the integrated ground 58 may be formed on the antenna tuning circuitry 52 such that a parasitic inductance between two or more grounding points in the antenna tuning circuitry 52 does not cause a potential difference between the grounding points, as will be discussed in further detail below.

Due to the integrated ground 58 provided by the antenna tuning switch circuitry 52, a low impedance path is not formed from the input port 56 through the control circuitry 64. Specifically, because the ground connection port 72 of the control circuitry 64 is maintained at the same potential as the ground attached to the shunt switch SH_SW, the lowest impedance path to ground from the input port 56 will occur through the shunt switch SH_SW, and will avoid the control circuitry 64. Accordingly, the antenna tuning switch circuitry 52 does not require an additional electrostatic discharge (ESD) protection switch, as in the conventional solution. By eliminating the need for an ESD protection switch in the antenna tuning switch circuitry 52, the parasitic capacitance associated with the antenna tuning switch circuitry 52 is substantially reduced. Accordingly, the performance of an antenna to which the antenna tuning switch circuitry 52 is attached is improved.

The integrated ground 58 provided in the antenna tuning switch circuitry 52 also allows for the reduction of the parasitic inductance associated with the antenna tuning switch circuitry 52. Because the integrated ground 58 is monolithically integrated on the semiconductor die 54 of the antenna tuning switch circuitry 52, the connection path to the integrated ground 58 from the shunt switch SH_SW and the control circuitry 64 is of negligible length. Accordingly, the connection paths introduce little to no parasitic inductance in the antenna tuning switch circuitry 52, thereby improving the performance of an antenna to which the antenna tuning switch circuitry 52 is attached.

Figure 5A:
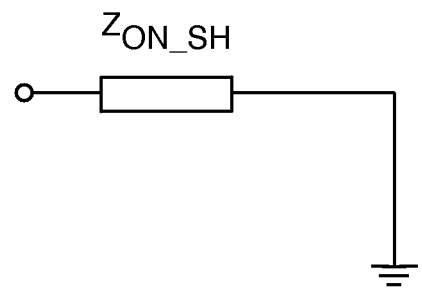
FIGS. 5A and 5B show simplified equivalent circuits for the antenna tuning switch circuitry shown in FIG. 4 in the ON state of the antenna tuning switch circuitry, and in the OFF state of the antenna tuning switch circuitry, respectively.

FIG. 5A shows a simplified equivalent circuit for the antenna tuning switch circuitry 52 shown in FIG. 4 when the antenna tuning switch circuitry 52 is in an ON state of operation. As shown in FIG. 5A, the ON state impedance of the antenna tuning switch circuitry 52 can be represented by the following equation:

$$Z_{ON} = Z_{ON\_SH} \quad (3)$$

where $Z_{ON\_SH}$ is the ON impedance of the shunt switch SH_SW. As shown by FIG. 5A and equation 3, the antenna tuning switch circuitry 52 offers a significant improvement over the conventional solutions by eliminating a significant portion of the contributors to the ON impedance of the antenna tuning switch circuitry 52. By reducing the ON impedance of the antenna tuning switch circuitry 52, the insertion loss of an attached antenna will be reduced, thereby increasing the strength and fidelity of signals transmitted and received therefrom.

Figure 5B:
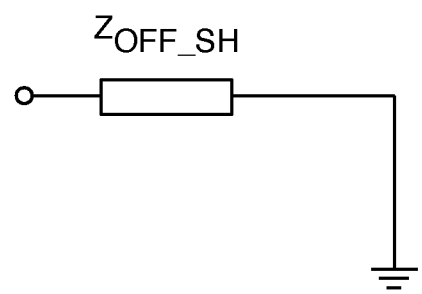

FIG. 5B shows a simplified equivalent circuit for the antenna tuning switch circuitry 52 when the antenna tuning switch circuitry 52 is in an OFF state of operation. As shown in FIG. 5B, the parasitic OFF state impedance of the antenna tuning switch circuitry 52 can be represented by the following equation:

$$Z_{ON} = Z_{OFF\_SH} \quad (4)$$

where $Z_{OFF\_SH}$ is equal to the parasitic OFF state impedance of the shunt switch SH_SW. As shown by FIG. 5B and equation 4, the antenna tuning switch circuitry 52 offers a significant improvement over the conventional solutions by eliminating a significant portion of the contributors to the parasitic OFF state impedance of the antenna tuning switch circuitry 52. By reducing the parasitic OFF state impedance of the antenna tuning switch circuitry 52, the insertion loss of an attached antenna will be reduced, thereby increasing the strength and fidelity of signals transmitted and received therefrom.

Figure 6:
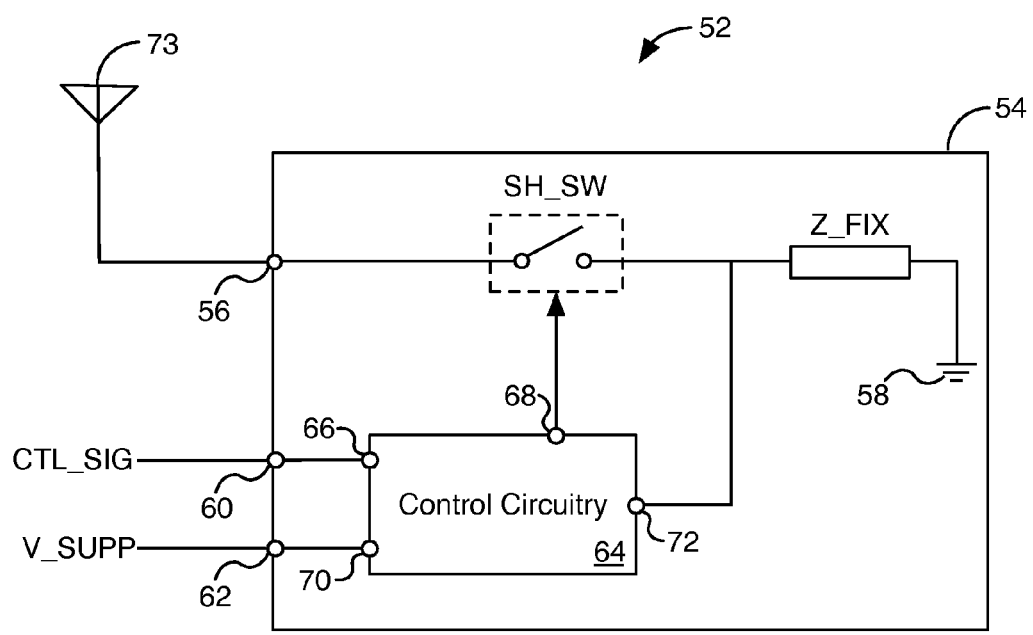
FIG. 6 shows antenna tuning switch circuitry according to an additional embodiment of the present disclosure.

FIG. 6 shows the antenna tuning switch circuitry 52 shown in FIG. 4 according to an additional embodiment of the present disclosure. The antenna tuning switch circuitry 52 shown in FIG. 6 is substantially the same as that shown in FIG. 4, but further includes a fixed impedance Z_FIX between the shunt switch SH_SW and the integrated ground 58. The fixed impedance Z_FIX may be chosen to achieve one or more operating conditions of an antenna to which the antenna tuning switch circuitry 52 is attached. For example, the fixed impedance Z_FIX may be chosen to reduce the voltage standing wave ratio (VSWR) of an antenna to which the antenna tuning switch circuitry 52 is attached. The fixed impedance Z_FIX may comprise one or more fixed impedance components coupled in series or parallel.

Figure 7:
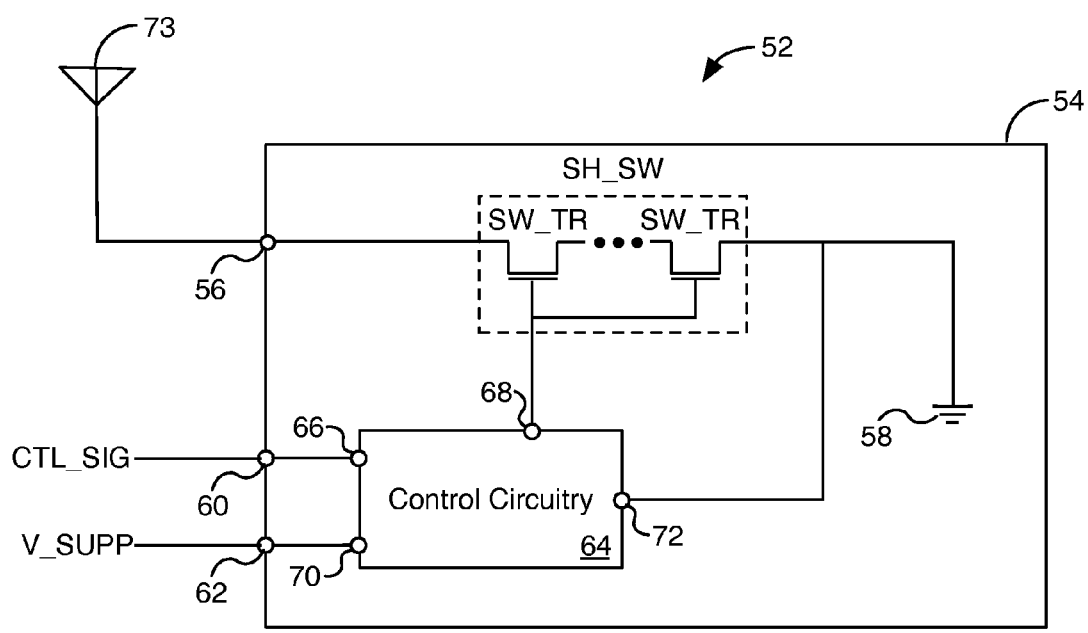
FIG. 7 shows details of the antenna tuning switch circuitry shown in FIG. 4 according to one embodiment of the present disclosure.

FIG. 7 shows details of the antenna tuning switch circuitry 52 shown in FIG. 4. As shown in FIG. 7, the shunt switch SH_SW may be a series of switching transistors SW_TR coupled in series. Each one of the switching transistors SW_TR may comprise a metal-oxide-semiconductor field-effect transistor (MOSFET), a field-effect transistor (FET), or the like. The control circuitry 64 may operate each one of the switching transistors SW_TR independently, or may control the group of switching transistors SW_TR via a shared control bus.

Figure 8:
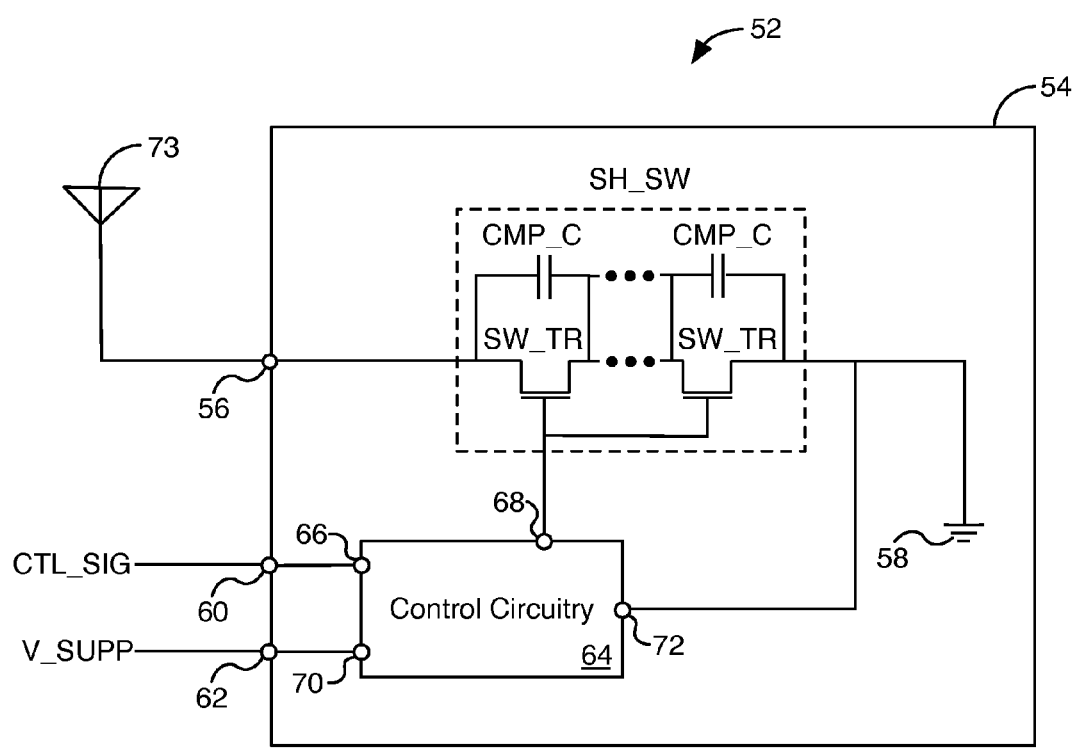
FIG. 8 shows an additional embodiment of the antenna tuning switch circuitry shown in FIG. 4.

FIG. 8 shows details of the antenna tuning switch circuitry 52 shown in FIG. 4 according to an additional embodiment of the present disclosure. As previously discussed, it is desirable for the antenna tuning switch circuitry 52 to be capable of handling high amplitude signals without breaking down in the OFF state of operation. Accordingly, compensation capacitors CMP_C may be added between the source and the drain of each one of the series of switching transistors SW_TR in order to increase the amount of voltage that the shunt switch SH_SW is capable of handling in the OFF state of operation without breaking down. Because each one of the compensation capacitors CMP_C add to the total parasitic impedance of the antenna tuning switch circuitry 52, the values of each one of the compensation capacitors CMP_C may be chosen in order to provide a desirable trade-off between the OFF state voltage handling capability and the parasitic impedance of the antenna tuning switch circuitry 52.

By using the integrated ground 58 in the antenna tuning switch circuitry 52, the reference plane of the antenna tuning switch circuitry 52 remains relatively constant over a variety of operating conditions, such as changes in the frequency of a signal presented at the input port 56. Due to the constant reference potential provided by the integrated ground 58, the values of the compensation capacitors CMP_C can be chosen with a high degree of precision. The high precision with which the compensation capacitors C_CMP can be chosen allows for a desirable trade-off between the OFF state voltage handling capability and the parasitic impedance of the antenna tuning switch circuitry 52, even as the operating conditions of the antenna tuning switch circuitry 52 change.

Figure 9:
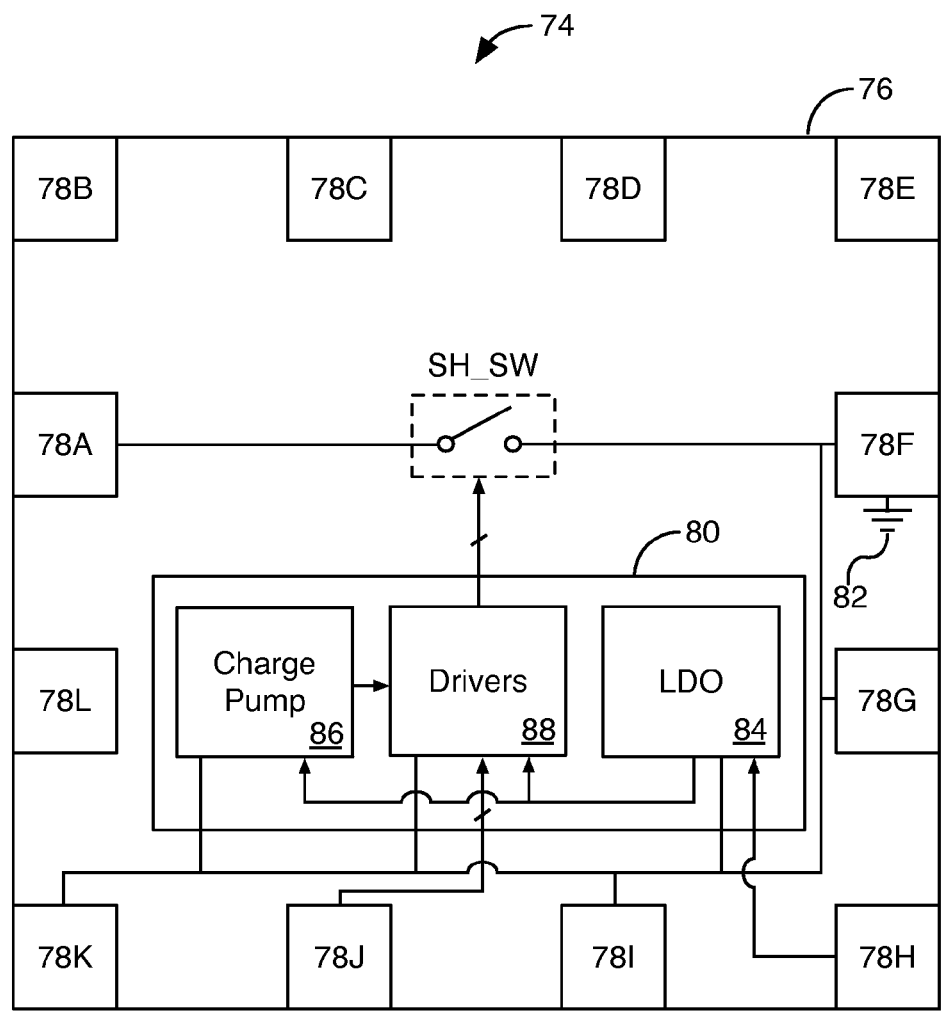
FIG. 9 shows a schematic representation of a semiconductor package including the antenna tuning switch circuitry according to one embodiment of the present disclosure.

FIG. 9 shows antenna tuning switch circuitry 74 according to an additional embodiment of the present disclosure. The antenna tuning switch circuitry 74 includes a flip-chip semiconductor die 76, one or more connection pads 78A-78L (referred to collectively as the connection pads 78), a shunt switch SH_SW, control circuitry 80, and an integrated ground 82. The shunt switch SH_SW is coupled between a first connection pad 78A, which acts as an input port for the antenna tuning switch circuitry 74, and a sixth connection pad 78F, which is coupled to the integrated ground 82. The integrated ground 82 is additionally coupled to a seventh connection pad 78G, a ninth connection pad 78I, and an eleventh connection pad 78K to provide multiple grounding points for the control circuitry in the antenna tuning switch circuitry 74, thereby improving the quality of the ground connection and reducing the parasitic inductance between ground connections in the antenna switching circuitry 74. The second connection pad 78B through the fifth connection pad 78E, as well as the twelfth connection pad 78L may be left disconnected according to one embodiment of the present disclosure.

The control circuitry 80 includes a low-dropout voltage regulator 84, charge pump circuitry 86, and switch driver circuitry 88. The low-dropout voltage regulator 84 may receive a supply voltage VCC from an eighth connection pad 78H, regulate the supply voltage VCC, and deliver the regulated supply voltage to the charge pump circuitry 86 and the switch driver circuitry 88. The low-dropout voltage regulator 84 may be grounded via the integrated ground 82. The charge pump circuitry 86 receives the regulated supply voltage from the low-dropout voltage regulator 84 and steps-up the regulated supply voltage to generate a stepped-up driver supply voltage, which is subsequently delivered to the switch driver circuitry 88. The charge pump circuitry 86 may also be grounded via the integrated ground 82. The switch driver circuitry 88 receives the stepped-up driver supply voltage and generates one or more switch control signals for driving the switching transistors (not shown) within the shunt switch SH_SW. The generated control signals for driving the shunt switch SH_SW may be based on one or more received control signals CTL_SIG from a tenth connection pad 78J of the antenna tuning switch circuitry 74. The switch driver circuitry 88 may also be grounded via the integrated ground 82.

As discussed above, the integrated ground 82 allows the elimination of an ESD protection switch from the antenna tuning switch circuitry 74. Accordingly, the footprint of the antenna tuning switch circuitry 74 shown in FIG. 7 may be much smaller than can otherwise be achieved by conventional means. Further, the integrated ground 82 allows the antenna tuning switch circuitry 74 to maintain a low resistance while in the ON state and a minimal parasitic impedance in the OFF state, thereby increasing the performance of an antenna to which the antenna tuning switch circuitry 74 is attached.

Figure 10:
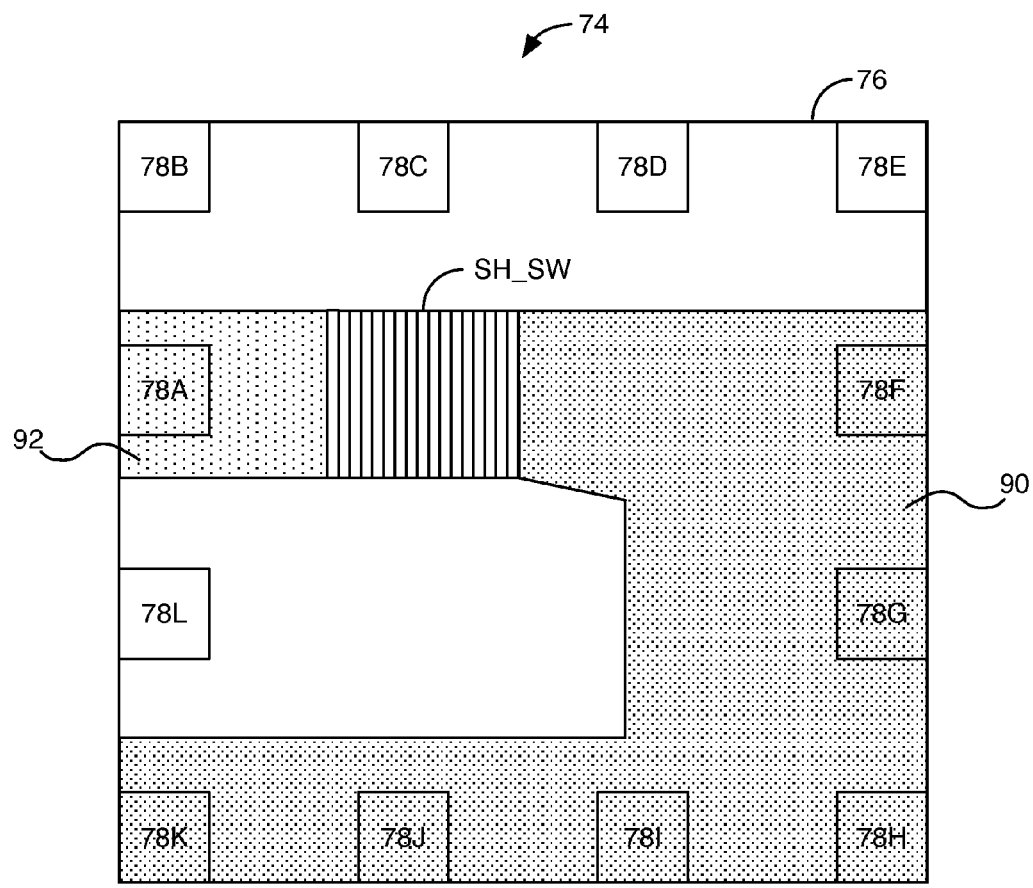
FIG. 10 shows details of the semiconductor package including the antenna tuning switch circuitry according to one embodiment of the present disclosure.

FIG. 10 shows a layout view of the antenna tuning switch circuitry 74 shown in FIG. 9 according to one embodiment of the present disclosure. The antenna tuning switch circuitry 74 includes a grounding plane 90, the shunt switch SH_SW, and an RF connection path 92. As shown in FIG. 10, the grounding plane 90 is substantial in size in order to provide a high quality, low impedance path between the ground connection points offered by the sixth connection pad 78F, the seventh connection pad 78G, the ninth connection pad 78I, and the eleventh connection pad 78K. The low impedance path offered by the grounding plane 90, together with the multiple ground connection points provided in the antenna tuning switch circuitry 74 effectively generate the integrated ground 82, which operates to ensure that a potential difference does not occur between grounding points in the antenna tuning switch circuitry 74. Accordingly, the performance of the antenna tuning switch circuitry 74 is improved, as noted above.

Further, the shunt switch SH_SW is placed in close proximity to the first connection pad 78A, which acts as an input port for the antenna tuning switch circuitry 74, and is connected between the first connection pad 78A and the grounding plane 90 via wide conductive paths. Accordingly, the parasitic series inductance of the shunt switch SH_SW is lowered, thereby further improving the performance of the antenna tuning switch circuitry 74.

Those skilled in the art will recognize improvements and modifications to the embodiments of the present disclosure. All such improvements and modifications are considered within the scope of the concepts disclosed herein and the claims that follow.

What is claimed is:

1. Antenna tuning switch circuitry comprising:
    an input port;
    an integrated ground connection;
    a shunt switch directly coupled between the input port and the integrated ground connection; and
    control circuitry comprising a control signal input port, a switch driver output port coupled to the shunt switch, and a ground connection port directly coupled to the integrated ground connection, wherein the input port, the integrated ground connection, the shunt switch, and the control circuitry are monolithically integrated together on a single semiconductor die.

2. The antenna tuning switch circuitry of claim 1 wherein the input port of the antenna tuning switch circuitry is coupled to a point on a surface of an antenna.

3. The antenna tuning switch circuitry of claim 2 wherein the control circuitry is configured to change the transmission and/or reception characteristics of the antenna by selectively placing the point on the surface of the antenna in contact with the integrated ground connection.

4. The antenna tuning switch circuitry of claim 1 wherein the control circuitry is configured to control the state of the shunt switch based on a control signal received at the control signal input port.

5. The antenna tuning switch circuitry of claim 1 wherein the control circuitry further comprises:
    a low-dropout voltage regulator;
    charge pump circuitry; and
    switch driver circuitry.

6. The antenna tuning switch circuitry of claim 5 wherein the low-dropout voltage regulator is configured to receive a supply voltage and generate a regulated supply voltage for delivery to the charge pump circuitry and the switch driver circuitry.

7. The antenna tuning switch circuitry of claim 5 wherein the low-dropout voltage regulator, the charge pump circuitry, and the switch driver circuitry are coupled to the integrated ground connection.

8. The antenna tuning switch circuitry of claim 6 wherein the charge pump circuitry is configured to receive the regulated supply voltage and generate a stepped-up driver supply voltage for delivery to the switch driver circuitry.

9. The antenna tuning switch circuitry of claim 8 wherein the switch driver circuitry is configured to receive the regulated supply voltage, the stepped-up driver supply voltage, and a control signal, and generate one or more switch control signals for controlling the state of the shunt switch.

10. The antenna tuning switch circuitry of claim 1 further including one or more fixed impedance components coupled between the shunt switch and the integrated ground connection.

11. Mobile terminal front end circuitry comprising:
    an antenna;
    a transmit chain configured to process signals for transmission to the antenna;
    a receive chain configured to process received signals from the antenna; and
    antenna tuning switch circuitry coupled to the antenna and comprising:
        an input port;
        an integrated ground connection;
        a shunt switch directly coupled between the input port and the integrated ground connection; and
        control circuitry comprising a control signal input port, a switch driver output port coupled to the shunt switch, and a ground connection port directly coupled to the integrated ground connection, wherein the input port, the integrated ground connection, the shunt switch, and the control circuitry are monolithically integrated together on a single semiconductor die.

12. The mobile terminal front end circuitry of claim 11 wherein the input port of the antenna tuning switch circuitry is coupled to a point on a surface of the antenna.

13. The mobile terminal front end circuitry of claim 12 wherein the control circuitry is configured to change the transmission and/or reception characteristics of the antenna by selectively placing the point on the surface of the antenna in contact with the integrated ground connection.

14. The mobile terminal front end circuitry of claim 11 wherein the control circuitry is configured to control the state of the shunt switch based on a control signal received at the control signal input port.

15. The mobile terminal front end circuitry of claim 11 wherein the control circuitry further comprises:
    a low-dropout voltage regulator;
    charge pump circuitry; and
    switch driver circuitry.

16. The mobile terminal front end circuitry of claim 15 wherein the low-dropout voltage regulator is configured to receive a supply voltage and generate a regulated supply voltage for delivery to the charge pump circuitry and the switch driver circuitry.

17. The mobile terminal front end circuitry of claim 15 wherein the low-dropout voltage regulator, the charge pump circuitry, and the switch driver circuitry are coupled to the integrated ground connection.

18. The mobile terminal front end circuitry of claim 16 wherein the charge pump circuitry is configured to receive the regulated supply voltage and generate a stepped-up driver supply voltage for delivery to the switch driver circuitry.

19. The mobile terminal front end circuitry of claim 18 wherein the switch driver circuitry is configured to receive the regulated supply voltage, the stepped-up driver supply voltage, and a control signal, and generate one or more switch control signals for controlling the state of the shunt switch.

20. The mobile terminal front end circuitry of claim 11 further including one or more fixed impedance components coupled between the shunt switch and the integrated ground connection.

\* \* \* \* \*